(12) United States Patent
Koch et al.

(10) Patent No.: US 7,793,193 B2
(45) Date of Patent: Sep. 7, 2010

(54) METHOD FOR ERROR CORRECTION OF PACKET DATA

(75) Inventors: Hartwig Koch, Hildesheim (DE); Frank Hofmann, Hildesheim (DE); Gerald Spreitz, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 10/592,855

(22) PCT Filed: Mar. 21, 2005

(86) PCT No.: PCT/EP2005/051303

§ 371 (c)(1),
(2), (4) Date: Aug. 14, 2008

(87) PCT Pub. No.: WO2005/093983

PCT Pub. Date: Oct. 6, 2005

(65) Prior Publication Data
US 2008/0307290 A1    Dec. 11, 2008

(30) Foreign Application Priority Data
Mar. 23, 2004 (DE) .............. 10 2004 014 594
Apr. 29, 2004 (DE) .............. 10 2004 021 308

(51) Int. Cl.
*H03M 13/00* (2006.01)
(52) U.S. Cl. .................. 714/776; 714/758; 714/774
(58) Field of Classification Search ............... 714/776, 714/758, 774, 755
See application file for complete search history.

(56) References Cited

U.S. PATENT DOCUMENTS 6,721,337 B1 * 4/2004 Kroeger et al. ............. 370/477
2002/0015405 A1 * 2/2002 Sepponen et al. .......... 370/389

FOREIGN PATENT DOCUMENTS

| EP | 0 889 613 | 1/1999 |
| JP | 2004-23577 | 1/2004 |
| WO | WO 01/15358 | 3/2001 |
| WO | WO 02/46942 | 6/2002 |

* cited by examiner

*Primary Examiner*—Fritz Alphonse
(74) *Attorney, Agent, or Firm*—Kenyon & Kenyon LLP

(57) ABSTRACT

In a method for error correction of packet data, in particular DAB (digital audio broadcasting) data packets, code words being used over multiple data packets, redundancy information for error correction is added while maintaining the original packet data structure, at the cost of a free data field or a useful data field. The cycle of the error protection is selected as a multiple of a minimum size for a packet length.

20 Claims, 6 Drawing Sheets

METHOD FOR ERROR CORRECTION OF PACKET DATA

FIELD OF THE INVENTION

The present invention relates to a method for error correction of packet data, in which code words are used over multiple data packets.

BACKGROUND INFORMATION

For data transmission in packet form, the DAB (digital audio broadcasting) standard, for example, specifies a method for how data is to be transmitted in packet mode. This provides a method for error recognition to recognize incorrectly transmitted data packets (CRC method). Since the individual packets may be assembled into data groups and further into data files, a single incorrect bit may corrupt the transmission of large quantities of data. In DAB, error protection is achieved via a convolutional code. The goal in this case is to achieve a bit error rate of $10^{-4}$. However, practical experience has shown that while this bit error rate is sufficiently low for audio, it is too high for transmitting data services.

In the DVB-T method, a chained code of convolutional code and block code is used. Very low bit error rates, in the order of magnitude of $10^{-8}$, may be achieved in this way.

SUMMARY

Errors may be corrected using the present invention, in which code words are used over multiple data packets, and redundancy information is added for error correction while maintaining the original packet data structure, at the cost of a free data field and a stuffing data field or a useful data field. The cycle of the error protection, e.g., its code word length, is selected as a multiple of a minimum size for a packet length. In accordance with the present invention, a DAB receiver does not have to have knowledge of this method, but the DAB receiver nonetheless recognizes the data as valid DAB packet mode data and is able to process it using a typical error recognition method (CRC), for example. Higher-quality receivers, which control the error correction method according to the present invention, may use the method and thus provide correct data files more often and/or more rapidly.

DETAILED DESCRIPTION

Figure 1:
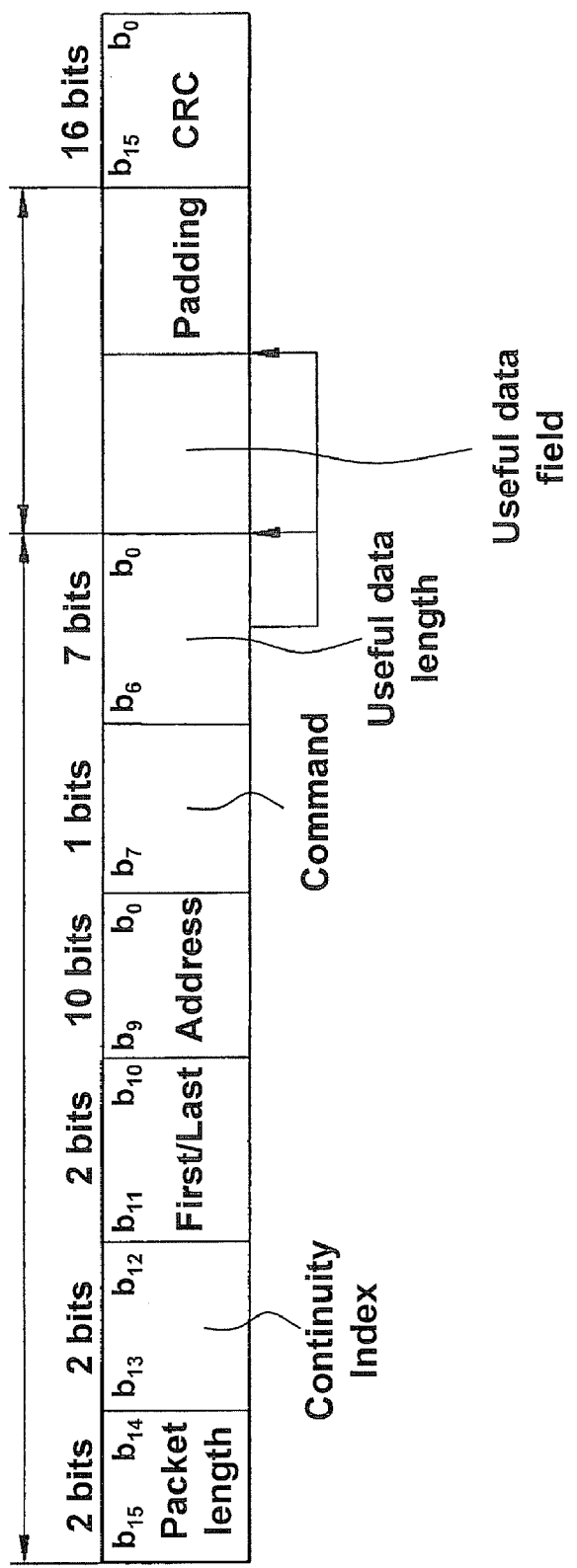
FIG. 1 shows a structure of data packets according to the DAB packet mode.

FIG. 1 shows the structure of a data packet according to the DAB packet mode. Information on the packet length, a continuity index, first/last, an address field, a command field, and information on the useful data length is included in the packet header. The packet data field having the useful data field and the field for padding data, e.g., stuffing data, adjoin this packet header. A 16 bit field for error recognition (CRC packet) then follows.

Valid lengths for packets are 24, 48, 72, or 96 bytes. This structure must be maintained in the achievement of the object according to the present invention in order to allow decoding in conventional receivers.

Any desired method which uses a systematic code may be employed for error correction. This means the data to be protected remains unchanged and only additional redundancy information in the form of additional bytes, which are used for error correction, is added. A Reed-Solomon code RS (255, 239), which is shortened to the packet sizes used, may be used as an example. Code shortening is a known method for this code.

Two example embodiments are suggested according to the present invention for inserting redundancy information:

1. Inserting the redundancy information into the padding field of the packets. A normal packet mode decoder will see it as padding and ignore it.
2. Inserting the redundancy information into a single packet without additional useful data, so that the normal packet mode decoder may simply ignore this packet.

Figure 2:
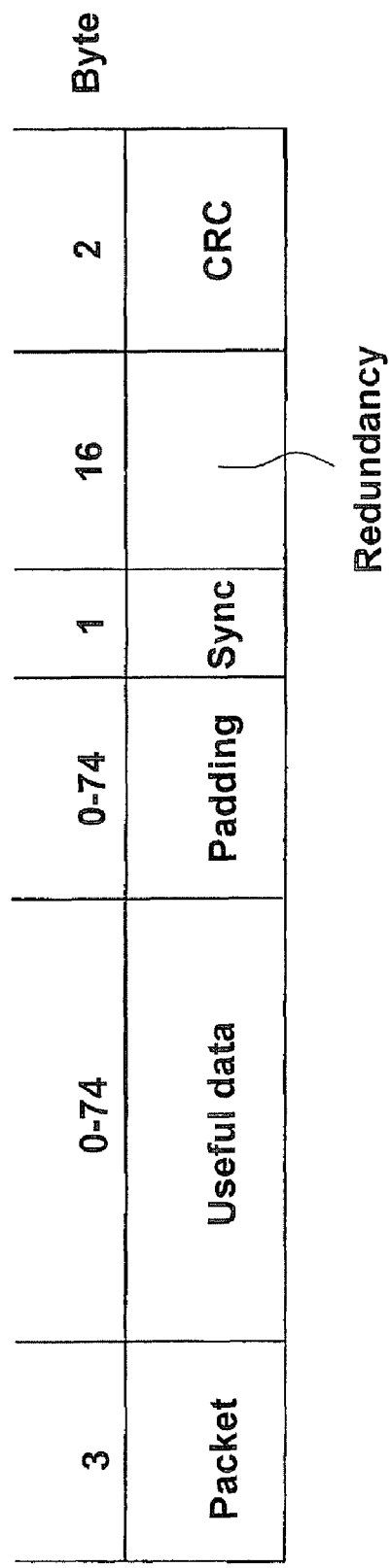
FIG. 2 shows the insertion of redundancy information in the padding field of the packets.

FIG. 2 shows the structure for the first embodiment. The packet header requires 3 bytes. It is followed by a useful data field of 0 to 74 bytes, then a padding field, the SYNC field, the redundancy information having 16 bytes, and 2 bytes for error recognition (CRC).

The SYNC byte is used for recognizing packets which contain redundancy bytes. Alternatively, the command bit (bit 7) from the packet header may be set in such packets.

Figure 3:
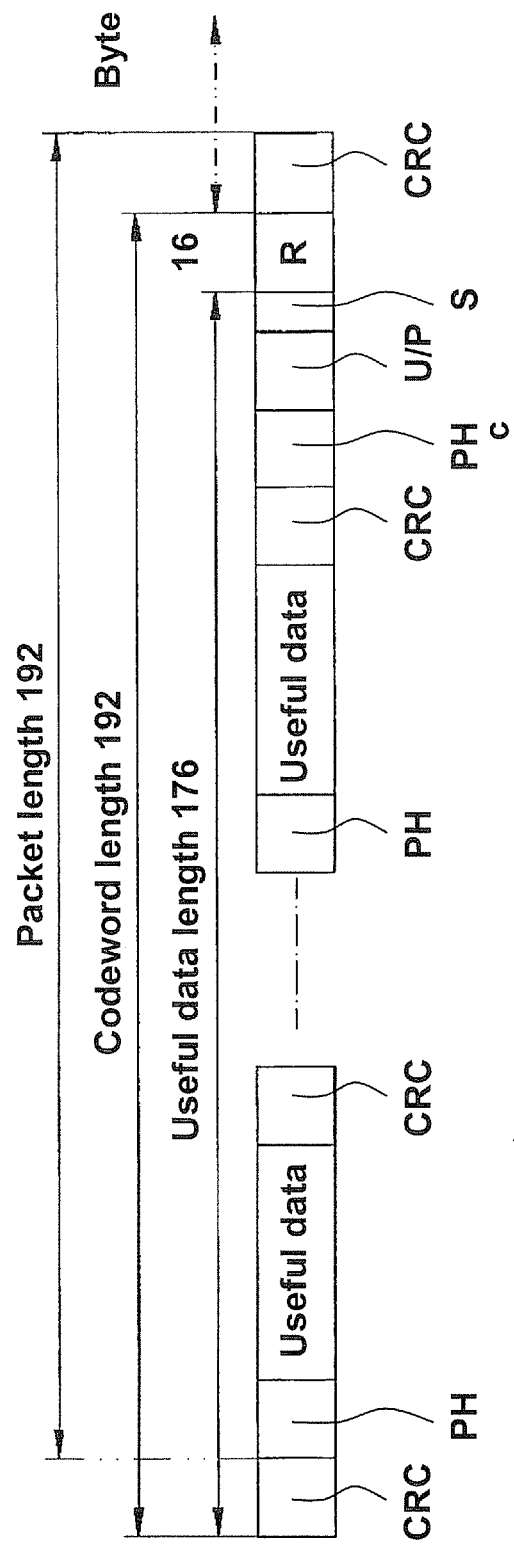
FIG. 3 shows the system of packets from FIG. 2 in a contiguous data stream.

FIG. 3 shows the system of packets from FIG. 1 in a contiguous data stream. In this example, the code is shortened to the code word length (192/176). The first value, 192, is the total code word length of the Reed-Solomon code, and the second value, 176, is the length of the useful data to be protected. The calculation of the redundancy bytes of the code word does not contain the CRC of the current packet having redundancy bytes, but rather that of the previous packet having redundancy bytes. The CRC for the current packet is then calculated using the redundancy bytes. Thus, both the code word length and also the sum of the packet lengths=192. The packet header is identified by PH here, S is the synchronizing data, and R is the redundancy information for error correction.

In this embodiment, the cycle of the error protection coincides with that of the packets. This means the code word length of the additional error protection must be a multiple of the minimum size for a packet length, here 24. Code word lengths of 168, 192, 216, and 240, in addition to others, are thus also conceivable, for example. The selected code word length is then filled up using an integral combination of the four possible packet sizes.

In order to be able to calculate the CRC of the packet which contains the additional redundancy information, the CRC bytes are handled in the particular next code word. If they were included in the same code word, the CRC calculation would not be possible, since the redundancy bytes of the RS code would also have to be calculated with the CRC bytes, which might in turn only be calculated as soon as the RS bytes were available. The RS bytes are thus calculated first and inserted into the packet. The CRC bytes are then calculated and appended. Since they are not in the same RS code word, this does not change the RS bytes.

Figure 4:
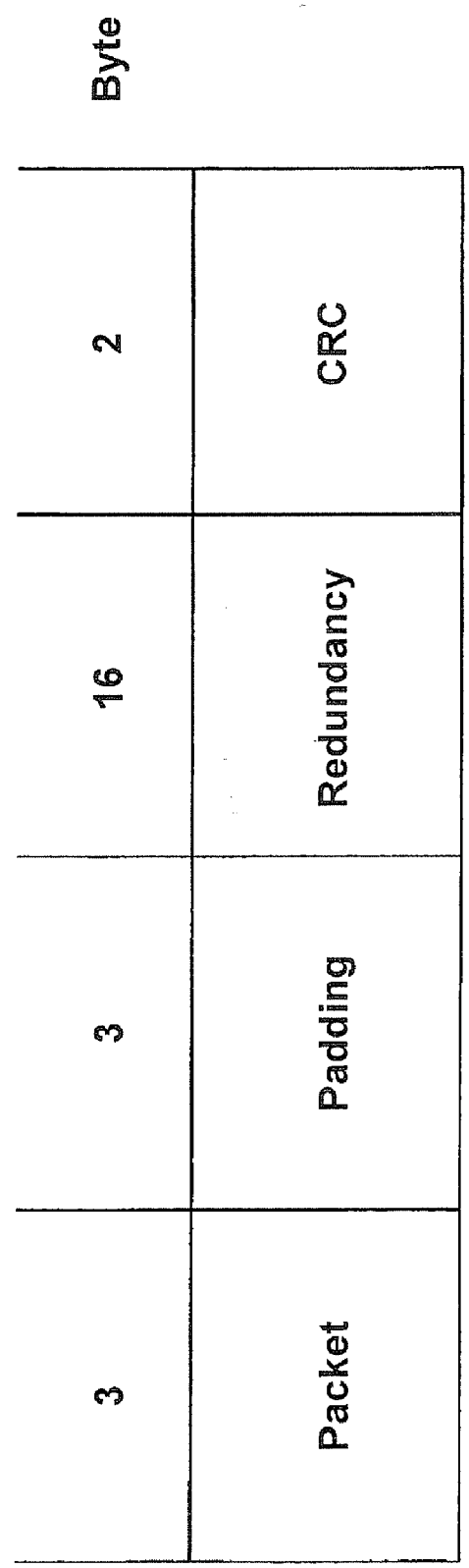
FIG. 4 shows the insertion of redundancy information into an individual packet without useful data.

FIG. 4 shows the second example embodiment for inserting the redundancy information.

A defined address is inserted into the packet header to recognize that redundancy bytes are present. A SYNC byte may also be used for this purpose. In this case, no useful data may be transported in the packet.

Figure 5:
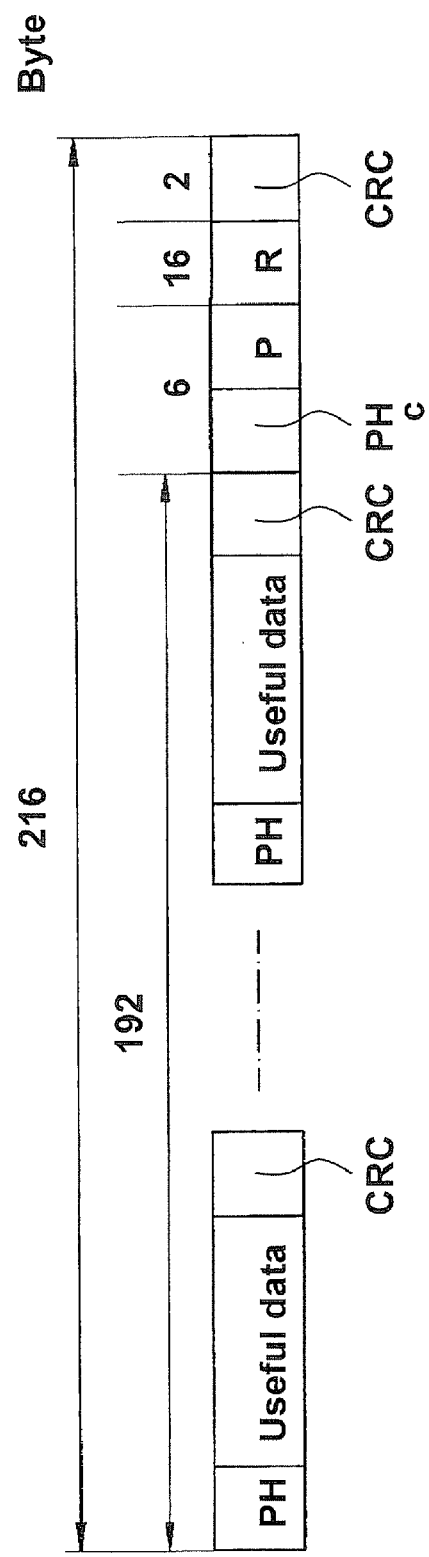
FIG. 5 shows the system of packet data from FIG. 4 in a contiguous data stream.

For this embodiment of FIG. 4, the system in a contiguous data stream is shown in FIG. 5.

In this example, the code is shortened to the length (208/192). The code word is not calculated beyond the packet header PH and the padding P.

In this embodiment, the cycle of the error protection useful data length must coincide with that of the packets, i.e., the useful data length of the code word of the additional error protection must be a multiple of the minimum size for a packet length, 24 here. The selected useful data length is filled up using an integral combination of the four possible packet sizes. The packet having the redundancy information R is appended thereto. At the time of decoding, only the redundancy bytes of the redundancy packet are used and the remainder is discarded completely (PHc, P, CRC).

Figure 6:
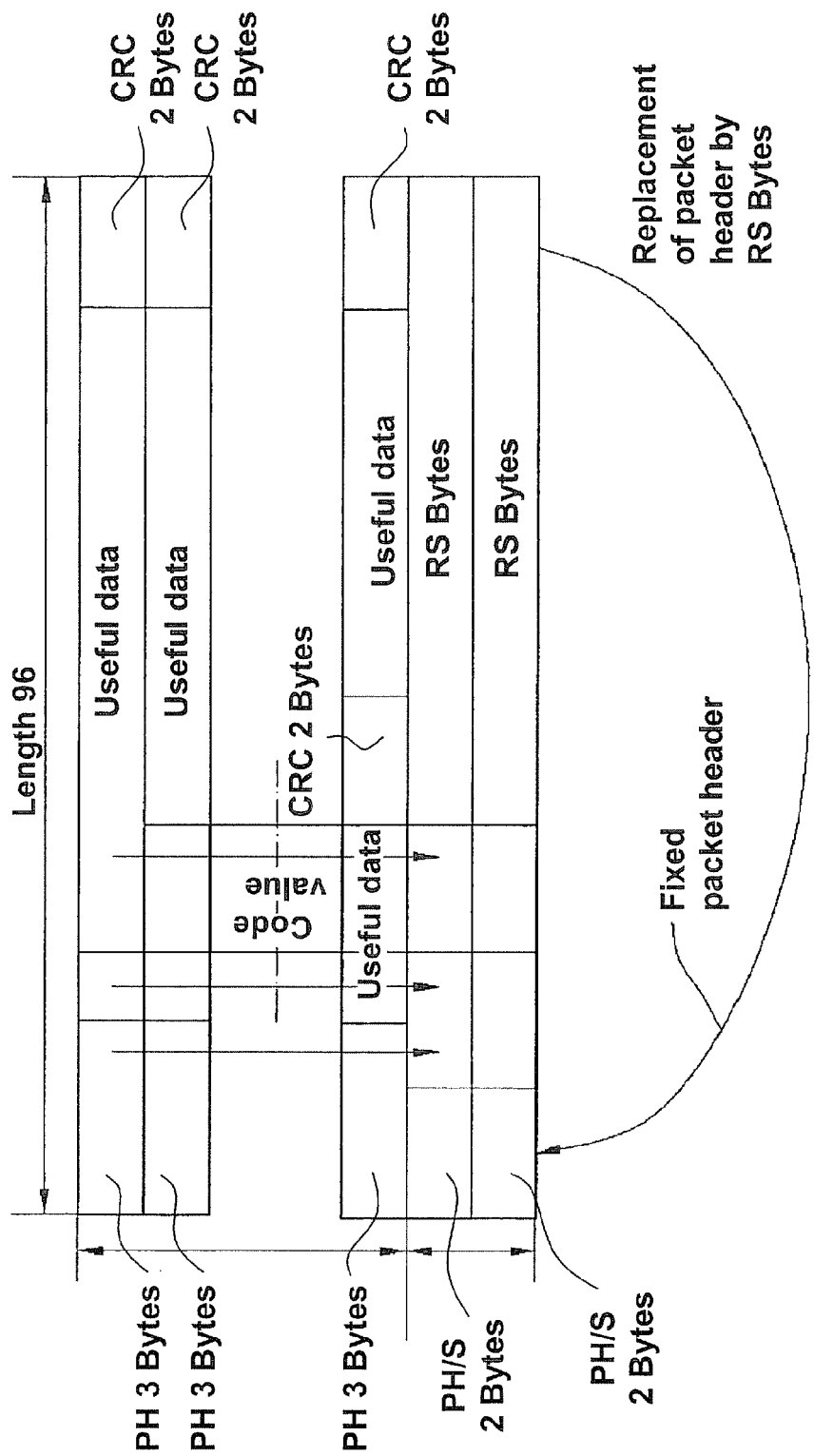
FIG. 6 shows an improved structure of the packets for burst error distribution.

FIG. 6 shows a further exemplary embodiment according to the present invention. The same Reed-Solomon mother code RS (255, 239) as in DVB and DMB video is used here. It is shortened as much as necessary by adding zeros before the protection bytes. The packets are situated in rows. After 188 rows, for example, the code words are calculated in columns. This results in improved error correction performance, since burst errors within the packets are distributed over multiple code words.

The RS redundancy bytes (RS bytes in FIG. 6) are also included in the DAB packet structure. To reduce the overhead, only a shortened packet header is used. The control bit is not necessary and the entire packet length is always used for the redundancy bytes. FIG. 6 also shows that the RS redundancy bytes of the first two columns are placed at the end of the RS packets. Therefore, the data capacity freed up in the shortened packet header is replaced by RS redundancy bytes. Error protection via the CRC columns is not required.

A completely backwards-compatible (level 2) method for error correction for DAB packet mode having implicit interleaving may thus be achieved.

What is claimed is:

1. A computer-implemented method for error correction of data transmitted in packet mode, wherein code words are used over multiple data packets in a data stream, comprising:
   providing, by a processor, a redundancy information for error correction while maintaining the original packet data structure; and
   selecting, by the processor, a cycle of error protection represented by a length of the code word;
   wherein:
      the redundancy information is provided in at least one of a free data field, a stuffing data field, and a useful data field of at least one data packet of the multiple data packets in the data stream;
      the data transmitted are digital audio broadcasting data packets;
      one of: a) an outer code word length is provided as a multiple of 24 bytes; and
      b) an inner code word length is provided as a multiple of 24 bytes; and
      a selected identifier in one of a packet header and a synchronization word is provided for at least one of:
         a) indicating that the redundancy information for error correction is contained in a data packet; and b) indicating the position of the code word in the data stream.

2. The computer-implemented method as recited in claim 1, wherein an error recognition information of a data packet, which data packet contains the redundancy information for error correction in connection with a first code word, is assigned to a next code word in the data stream.

3. The computer-implemented method as recited in claim 1, wherein a Reed-Solomon code is used for error correction, which Reed-Solomon code is shortened to the packet lengths being used in the data stream.

4. The computer-implemented method as recited in claim 1, wherein a separate data packet is provided for the redundancy information, which separate data packet is appended to data packets for useful information.

5. The computer-implemented method as recited in claim 4, wherein, for decoding of the data packet containing the redundancy information, only the redundancy information is analyzed and the remaining bytes of the data packet are discarded.

6. The computer-implemented method as recited in claim 1, wherein the multiple data packets are arranged in rows and the code words are arranged in columns.

7. The computer-implemented method as recited in claim 6, wherein burst errors within the data packets are distributed over multiple code words.

8. The computer-implemented method as recited in claim 7, wherein a shortened packet header is used, and wherein a data capacity resulting from the shortened packet header is used for accommodating the redundancy information.

9. The computer-implemented method as recited in claim 6, wherein a shortened packet header is used, and wherein a data capacity resulting from the shortened packet header is used for accommodating the redundancy information.

10. The computer-implemented method of claim 1, wherein 24 bytes is a minimum size for a packet length of a data packet according to the packet mode.

11. A computer-implemented method for error correction of data transmitted in packet mode, wherein code words are used over multiple data packets in a data stream, comprising:
   providing, by a processor, a redundancy information for error correction while maintaining the original packet data structure; and
   selecting, by the processor, a cycle of error protection represented by a length of the code word;
   wherein:
      the redundancy information is provided in at least one of a free data field, a stuffing data field, and a useful data field of at least one data packet of the multiple data packets in the data stream;
      the data transmitted are digital audio broadcasting data packets;
      one of: a) an outer code word length is provided as a multiple of a minimum size for a packet length of a data packet that a receiver to which the data is transmitted is configured to decode; and b) an inner code word length is provided as a multiple of the minimum size; and
      a selected identifier in one of a packet header and a synchronization word is provided for at least one of:
         a) indicating that the redundancy information for error correction is contained in a data packet; and b) indicating the position of the code word in the data stream.

12. The computer-implemented method as recited in claim 11, wherein the minimum size is 24 bytes.

13. The computer-implemented method as recited in claim 11, wherein an error recognition information of a data packet, which data packet contains the redundancy information for error correction in connection with a first code word, is assigned to a next code word in the data stream.

14. The computer-implemented method as recited in claim 11, wherein a Reed-Solomon code is used for error correction, which Reed-Solomon code is shortened to the packet lengths being used in the data stream.

15. The computer-implemented method as recited in claim 11, wherein a separate data packet is provided for the redundancy information, which separate data packet is appended to data packets for useful information.

16. The computer-implemented method as recited in claim 15, wherein, for decoding of the data packet containing the redundancy information, only the redundancy information is analyzed and the remaining bytes of the data packet are discarded.

17. The computer-implemented method as recited in claim 11, wherein the multiple data packets are arranged in rows and the code words are arranged in columns.

18. The computer-implemented method as recited in claim 17, wherein burst errors within the data packets are distributed over multiple code words.

19. The computer-implemented method as recited in claim 17, wherein a shortened packet header is used, and wherein a data capacity resulting from the shortened packet header is used for accommodating the redundancy information.

20. A computer-implemented method for error correction of data transmitted in packet mode, wherein code words are used over multiple data packets in a data stream, comprising:
providing, by a processor, a redundancy information for error correction while maintaining the original packet data structure; and
selecting, by the processor, a cycle of error protection represented by a length of the code word;
wherein:
the redundancy information is provided in at least one of a free data field, a stuffing data field, and a useful data field of at least one data packet of the multiple data packets in the data stream;
the data transmitted are digital audio broadcasting data packets;
one of: a) an outer code word length is provided as a multiple of a minimum size, as predefined by the packet mode, for a packet length of a data packet; and b) an inner code word length is provided as a multiple of the minimum size; and
a selected identifier in one of a packet header and a synchronization word is provided for at least one of: a) indicating that the redundancy information for error correction is contained in a data packet; and b) indicating the position of the code word in the data stream.

* * * * *